(No Model.)

F. P. ALLEN.
CANNON PINION FOR WATCHES.

No. 443,384. Patented Dec. 23, 1890.

WITNESSES:
Fred G. Dieterich
Edw. W. Byrn.

INVENTOR:
Frank P. Allen,
BY Munn & Co.
ATTORNEYS

UNITED STATES PATENT OFFICE.

FRANK P. ALLEN, OF FORT GAINES, GEORGIA.

CANNON-PINION FOR WATCHES.

SPECIFICATION forming part of Letters Patent No. 443,384, dated December 23, 1890.

Application filed July 1, 1890. Serial No. 357,450. (No model.)

*To all whom it may concern:*

Be it known that I, FRANK P. ALLEN, of Fort Gaines, in the county of Clay and State of Georgia, have invented a new and useful Improvement in Watches, of which the following is a specification.

My invention is in the nature of an improved means for adjusting the cannon-pinion of a watch to the arbor of the center wheel with a constant and reliable frictional contact; and it consists in a concave spring interposed between a shoulder on the arbor and the inner end of the cannon-pinion, in combination with these parts and a concentric countersunk screw for holding down the cannon-pinion upon the arbor and compressing said spring, as hereinafter more fully described.

Figure 1:
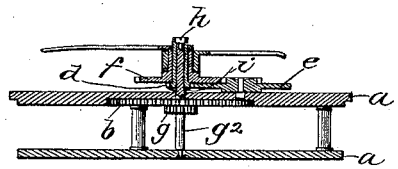
Figure 2:
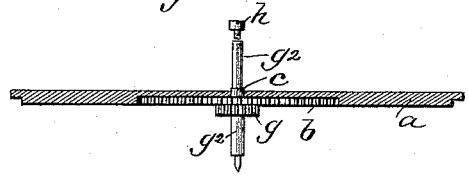
Figure 3:
Figure 4:
Figure 5:
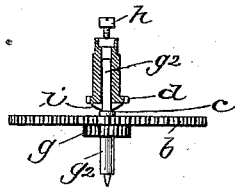

Figure 1 is a sectional view of a part of a watch-movement embodying my invention. Fig. 2 is a detached view of the center-pinion with arbor and screw. Fig. 3 is an enlarged sectional view of the cannon-pinion and concentric screw. Fig. 4 is an edge and face view of the concave spring, and Fig. 5 is a sectional view of the parts assembled and ready to be fastened to place by the screw.

In the drawings, $a$ $a$ represent the upper and lower plates of a watch-movement, in which is journaled the arbor $g^2$, carrying center wheel $b$, pinion $g$, and shoulder $c$.

$e$ and $f$ are the minute and hour wheels that govern the hands upon the dial.

$d$ is the cannon-pinion, which slips over the arbor $g^2$. This cannon-pinion is countersunk or recessed at its upper end to receive the head of a screw $h$, that enters the end of the arbor $g^2$ and holds the cannon-pinion on.

$i$ is a concave spring-disk slitted radially and arranged to be interposed between the shoulder $c$ on the arbor and the lower end of the cannon-pinion. When the screw $h$ is turned up, it compresses the spring-disk $i$, which establishes the desired frictional contact between the cannon-pinion and the arbor.

The advantages of this arrangement are that there is nothing to wear out, as the parts are all made of steel and are designed to be oiled, and the friction between the cannon-pinion and arbor is maintained uniform and constant without depreciation and looseness.

This improvement is not only designed for new watches, but is also applicable with very little alteration to old watches.

In defining my invention with greater clearness I would state that I am aware that a concave spring has been applied to the arbor of a clock to produce friction against a sleeve, and I therefore make no claim to this feature except in combination with the cannon-pinion having a recessed or countersunk upper end and a holding-screw entering the arbor and having its head embedded in the countersink. This permits the watch-hand to be readily slipped off or on and makes a simple, neat, and effective construction for the purpose.

Having thus described my invention, what I claim as new is—

The combination, with the arbor of the center wheel bearing a shoulder $c$, and the cannon-pinion $d$, arranged upon the said arbor and having a countersunk upper end, of a screw $h$, having its head embedded in the countersink of the cannon-pinion and its threaded end entering the end of the arbor, and a concave spring-disk $i$, interposed between the shoulder $c$ and the end of the cannon-pinion, substantially as shown and described.

FRANK P. ALLEN.

Witnesses:
   J. D. RAMBO,
   J. E. PETERSON.